United States Patent
Kim et al.

(10) Patent No.: US 12,548,765 B2
(45) Date of Patent: Feb. 10, 2026

(54) POSITIVE ACTIVE MATERIAL FOR RECHARGEABLE LITHIUM BATTERY AND RECHARGEABLE LITHIUM BATTERY INCLUDING SAME

(71) Applicant: Samsung SDI Co., Ltd., Yongin-si (KR)

(72) Inventors: Minhan Kim, Yongin-si (KR); Dongjin Kim, Yongin-si (KR); Ilseok Kim, Yongin-si (KR); Dohyung Park, Yongin-si (KR); Junseok Park, Yongin-si (KR); Daehoe Lee, Yongin-si (KR); Okgyu Lim, Yongin-si (KR); Gyuran Jeon, Yongin-si (KR); Jeonjin Choi, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 16/044,399

(22) Filed: Jul. 24, 2018

(65) Prior Publication Data

US 2019/0027739 A1  Jan. 24, 2019

(30) Foreign Application Priority Data

Jul. 24, 2017 (KR) .................. 10-2017-0093593
Jul. 19, 2018 (KR) .................. 10-2018-0084161

(51) Int. Cl.
*H01M 4/36* (2006.01)
*C01G 53/42* (2025.01)
(Continued)

(52) U.S. Cl.
CPC ............ *H01M 4/366* (2013.01); *C01G 53/42* (2013.01); *C01G 53/50* (2013.01); *H01M 4/364* (2013.01);
(Continued)

(58) Field of Classification Search
CPC ............ H01M 10/0525; H01M 4/366; H01M 10/052; H01M 4/505; H01M 4/525; H01M 4/364; H01M 4/667
See application file for complete search history.

(56) References Cited

U.S. PATENT DOCUMENTS 9,209,455 B2  12/2015  Ofer et al.
2005/0058907 A1  3/2005  Kurihara et al.
(Continued)

FOREIGN PATENT DOCUMENTS

CN  1585159 A  2/2005
CN  102127242 A  7/2011
(Continued)

OTHER PUBLICATIONS

Jung, Sung-Kyun, et al., "Understanding the Degradation Mechanisms of $LiNi_{0.5}Co_{0.2}Mn_{0.3}O_2$ Cathode Material in Lithium Ion Batteries," Advanced Energy Materials, 2013, 7 pages.
(Continued)

*Primary Examiner* — Armindo Carvalho, Jr.
(74) *Attorney, Agent, or Firm* — Womble Bond Dickinson (US) LLP

(57) ABSTRACT

A positive active material for a rechargeable lithium battery includes a core including a compound represented by Chemical Formula 1 and a functional layer on a surface of the core. The functional layer has one kind of a crystal structure that is different from the crystal structure of the core. The positive active material includes about 100 ppm to about 400 ppm of sulfur:

$$Li_aNi_xCo_yMe_zO_2, \quad \text{Chemical Formula 1}$$

wherein in Chemical Formula 1, $0.9 \leq a \leq 1.1$, $0.5 \leq x \leq 0.93$, $0 < y \leq 0.3$, $0 < z \leq 0.3$, $x+y+z=1$, and Me is Mn or Al.

12 Claims, 9 Drawing Sheets

(51) Int. Cl.

| | | |
|---|---|---|
| *C01G 53/50* | (2025.01) | |
| *H01M 4/02* | (2006.01) | |
| *H01M 4/505* | (2010.01) | |
| *H01M 4/525* | (2010.01) | |
| *H01M 10/052* | (2010.01) | |
| *H01M 10/0525* | (2010.01) | |

(52) U.S. Cl.
CPC .......... *H01M 4/505* (2013.01); *H01M 4/525* (2013.01); *H01M 10/0525* (2013.01); *C01P 2006/80* (2013.01); *H01M 2004/028* (2013.01); *H01M 10/052* (2013.01)

(56) References Cited

U.S. PATENT DOCUMENTS

| | | | |
|---|---|---|---|
| 2009/0286157 A1* | 11/2009 | Chen | H01M 4/0421 252/182.1 |
| 2012/0231351 A1 | 9/2012 | Jung et al. | |
| 2012/0282524 A1 | 11/2012 | Kono et al. | |
| 2013/0337331 A1 | 12/2013 | Mori et al. | |
| 2014/0034872 A1 | 2/2014 | Watanabe et al. | |
| 2014/0308572 A1 | 10/2014 | Tsuchida et al. | |
| 2015/0340689 A1* | 11/2015 | Song | H01M 4/5825 427/126.3 |
| 2015/0349370 A1* | 12/2015 | Snyder | H01M 10/02 429/152 |
| 2016/0036051 A1* | 2/2016 | Iriyama | H01M 4/13 429/188 |
| 2016/0156021 A1* | 6/2016 | Aihara | H01M 4/131 429/304 |
| 2017/0018768 A1* | 1/2017 | Yushin | H01M 4/38 |
| 2017/0077504 A1* | 3/2017 | Ise | H01M 4/366 |
| 2017/0084916 A1* | 3/2017 | Oka | H01M 4/366 |
| 2017/0141382 A1 | 5/2017 | Dadheech et al. | |
| 2017/0187035 A1* | 6/2017 | Yanagihara | H01M 4/505 |
| 2017/0207444 A1* | 7/2017 | Yanagihara | C01G 53/42 |
| 2017/0250404 A1* | 8/2017 | Cho | H01M 4/505 |

FOREIGN PATENT DOCUMENTS

| | | |
|---|---|---|
| CN | 103975466 A | 8/2014 |
| CN | 105009348 A | 10/2015 |
| EP | 1587156 A1 | 10/2005 |
| EP | 2104163 A1 | 9/2009 |
| EP | 2602849 A2 | 6/2013 |
| EP | 2704236 A2 | 3/2014 |
| JP | 8-319120 A | 12/1996 |
| JP | 2003-059490 A | 2/2003 |
| JP | 2006-228604 A | 8/2006 |
| JP | 2009-266712 A | 11/2009 |
| JP | 2013-20736 A | 1/2013 |
| JP | 2013-137947 A | 7/2013 |
| JP | 201633902 A | 3/2016 |
| JP | 2016103411 A | 6/2016 |
| JP | 2017-117700 A | 6/2017 |
| KR | 10-2005-0048453 A | 5/2005 |
| KR | 10-0756927 B1 | 9/2007 |
| KR | 10-2012-0103556 A | 9/2012 |
| KR | 10-2014-0047657 A | 4/2014 |
| WO | WO 2012/086273 A1 | 6/2012 |
| WO | 2012-131779 A1 | 10/2012 |
| WO | 2014/136794 A1 | 9/2014 |
| WO | WO 2015/163356 A1 | 10/2015 |
| WO | 2016049014 A1 | 3/2016 |

OTHER PUBLICATIONS

EPO Extended Search Report dated Nov. 21, 2018, for corresponding European Patent Application No. 18185277.3 (10 pages).
Japanese Patent Office Action for corresponding Japanese Patent Application No. 2018-138314, dated Sep. 2, 2019, 4 pages.
National Intellectual Property Administration, PRC, Office action issued in corresponding Chinese Patent Application No. 201810819323.1, Dec. 21, 2020 and accompanying Search Report dated Dec. 11, 2020, 16 pages.
Japan Patent Office, Notice of Allowance issued in corresponding Japanese Patent Application No. 2018-138314, Nov. 9, 2020, 3 pages.
Notice of Opposition mailed Jul. 28, 2021 (issued Jul. 5, 2021), in corresponding Japanese Patent Application No. 2018-138314 (U.S. Pat. No. 6,806,739) (39 pages).
Chinese Office action dated Aug. 11, 2021, issued in corresponding Chinese Patent Application No. 201810819323.1 (13 pages).
Notice of Allowance issued Nov. 16, 2021, in corresponding Chinese Patent Application No. 201810819323.1 and English language translation (7 pages).
Korean Office Action dated Jun. 19, 2023, of the corresponding Korean Patent Application No. 10-2018-0084161 (4 pages).
Notice of Allowance dated Oct. 20, 2023, of the corresponding Korean Patent Application No. 10-2018-0084161 (3 pages).

\* cited by examiner

POSITIVE ACTIVE MATERIAL FOR RECHARGEABLE LITHIUM BATTERY AND RECHARGEABLE LITHIUM BATTERY INCLUDING SAME

CROSS-REFERENCE TO RELATED APPLICATION

This application claims priority to and the benefit of Korean Patent Application No. 10-2017-0093593 filed in the Korean Intellectual Property Office on Jul. 24, 2017, and Application No. 10-2018-0084161 filed in the Korean Intellectual Property Office on Jul. 19, 2018, the entire contents of each of which are incorporated herein by reference.

BACKGROUND

1. Field

One or more aspects of embodiments of the present disclosure relate to a positive active material for a rechargeable lithium battery and a rechargeable lithium battery including the same.

2. Description of the Related Art

A portable information device such as a cell phone, a laptop, smart phone, and/or the like may use a rechargeable lithium battery as a driving power source.

An example rechargeable lithium battery includes a positive electrode, a negative electrode, and an electrolyte. As for a positive active material of the positive electrode, an oxide consisting of lithium and transition metals and having a structure capable of intercalating lithium ions, such as $LiCoO_2$, $LiMn_2O_4$, and/or $LiNi_{1-x}Co_xO_2$ (0<x<1) has been used in the related art.

As for a negative active material, various carbon-based materials such as artificial graphite, natural graphite, and/or hard carbon, which intercalate and deintercalate lithium ions, have been used in the related art.

Recently, mobile information terminal devices have been rapidly down-sized and lightened, and thus higher capacity rechargeable lithium batteries have been required as a driving power source for each of these devices. In addition, in order to use the rechargeable lithium battery as an actuating power source or as a power storage source for a hybrid vehicle or an electric vehicle, research on development of a battery having satisfactory high rate capability, capable of being rapidly charged and discharged, and/or having excellent cycle characteristics is actively being conducted.

SUMMARY

One or more aspects of embodiments of the present disclosure are directed toward a positive active material for a rechargeable lithium battery having high capacity, high stability, and/or improved cycle-life characteristics.

One or more aspects of embodiments of the present disclosure are directed toward a rechargeable lithium battery including the positive active material.

One or more embodiments of the present disclosure provide a positive active material for a rechargeable lithium battery including a core including a compound represented by Chemical Formula 1 and a functional layer on a surface of the core, wherein the functional layer has one kind of a crystal structure different from a crystal structure of the core, and the positive active material includes about 100 ppm to about 400 ppm of sulfur:

$$Li_aNi_xCo_yMe_zO_2. \qquad \text{Chemical Formula 1}$$

In Chemical Formula 1, 0.9≤a≤1.1, 0.5≤x≤0.93, 0<y≤0.3, 0<z≤0.3, x+y+z=1, and

Me is Mn or Al.

One or more embodiments of the present disclosure provide a rechargeable lithium battery including a positive electrode including the positive active material, a negative electrode including a negative active material, and an electrolyte.

The positive active material for a rechargeable lithium battery according to embodiments of the present disclosure may stabilize a structure of the positive electrode and suppress (or reduce) a side reaction with an electrolyte solution, thus improving cell performance remarkably.

Accordingly, a rechargeable lithium battery including the positive electrode including the positive active material of the present embodiments is capable of improving cycle-life characteristics remarkably while having high capacity and high stability.

DETAILED DESCRIPTION

Hereinafter, the present disclosure will be described more fully hereinafter with reference to the accompanying drawings, in which example embodiments of the disclosure are shown. The present disclosure may be modified in various different ways, all without departing from the spirit or scope of the present disclosure.

In addition, unless explicitly stated otherwise, the word "comprise," and variations such as "comprises" or "comprising," will be understood to imply the inclusion of stated elements but not the exclusion of any other elements.

Expressions such as "at least one of," "one of," and "selected from," when preceding a list of elements, modify the entire list of elements and do not modify the individual elements of the list. Further, the use of "may" when describing embodiments of the present invention refers to "one or more embodiments of the present invention."

Several kinds (or types) of positive active material may be used for a rechargeable lithium battery, and currently, a positive active material using lithium cobalt oxide, that is, $LiCoO_2$, is the widely used among them. However, the positive active material using lithium cobalt oxide has a problem of a high manufacturing cost and an unstable supply due to a large variety of applications and rarity of cobalt.

In order to solve this problem, various researches on applying an alternative material replacing cobalt are being made, for example, development of a positive active material using a less expensive material, such as nickel (Ni) or manganese (Mn) alone or its composite, instead of the expensive cobalt.

For example, a nickel (Ni)-based composite oxide has recently been actively researched as a material capable of overcoming many limits of $LiCoO_2$, $LiNiO_2$, $Li_2MnO_3$ and the like in terms of a cost, stability, capacity, and/or the like.

In general, a rechargeable battery for an electric vehicle (EV) requires high capacity, high power, a long cycle-life, and/or high safety. Research on accomplishing higher capacity of positive and negative active materials to increase the battery's endurance range up to greater than or equal to about 300 km is being actively made.

The nickel (Ni)-based composite oxide can undergo a reaction of generating two electrons as shown in $Ni^{2+} \rightarrow Ni^{4+}+2e$, when one lithium atom is released during the charge. As such, nickel (Ni) may increase capacity as more electrons are generated, compared with other elements generating one electron, such as cobalt (Co), manganese (Mn), and/or the like.

However, the nickel (Ni)-based composite oxide has a problem of having an unstable structure and being relatively easily collapsed due to more deintercalation of lithium during the charge. Thus, the nickel (Ni)-based composite oxide can relatively more severely deteriorate the capacity of the battery through charges and discharges, as compared with a lithium cobalt oxide.

Example embodiments of the present disclosure provide for a positive active material for a rechargeable lithium battery which can simultaneously realize high capacity and excellent cycle-life characteristics by forming a functional layer on the surface of a core including the nickel (Ni)-based composite oxide. Example embodiments of the present disclosure also provide for the nickel (Ni)-based composite oxide as a positive active material for a rechargeable lithium battery, wherein at least a part of the functional layer has one kind (or type) of a crystal structure that is different from that of the core.

Figure 1:
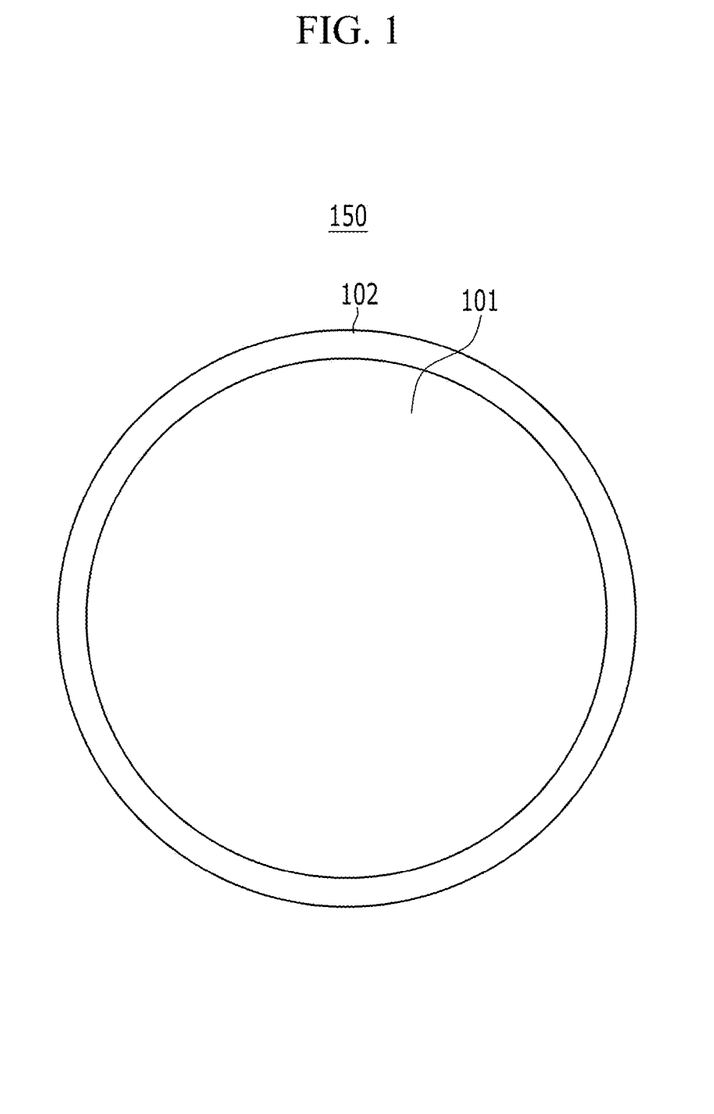
FIG. 1 shows a cross-section of a positive active material for a rechargeable lithium battery according to an example embodiment.

FIG. 1 shows a cross-section of a positive active material for a rechargeable lithium battery according to an example embodiment.

Referring to FIG. 1, a positive active material 150 for a rechargeable lithium battery according to the example embodiment includes a core 101 and a functional layer 102 on the surface of the core 101.

For example, the core 101 may include a compound represented by Chemical Formula 1:

$Li_aNi_xCo_yMe_zO_2$. Chemical Formula 1

In Chemical Formula 1, 0.9≤a≤1.1, 0.5≤x≤0.93, 0<y≤0.3, 0<z≤0.3, x+y+z=1, and Me is Mn or Al. In one embodiment, 0<y≤0.2, 0<z≤0.1.

Accordingly, the core included in the positive active material is a compound having a high nickel content, that is, x in a range of about 0.5 to about 0.93. In some embodiments, in Chemical Formula 1, the x may be in a range of 0.7≤x≤0.93 or 0.8≤x≤0.9, without limitation.

When the compound represented by Chemical Formula 1 having a high nickel content, that is, x in a range of about 0.5 to about 0.93, is used as a core, a rechargeable lithium battery having high capacity may be manufactured. For example, when compared with a compound having the x in a range of less than about 0.5, that is, a low nickel content, used as a positive active material for a rechargeable lithium battery, the positive active material of the present embodiments may obtain very high (or suitably high) capacity.

The functional layer 102 may have one kind (or type) of crystal structure that is different from that of the core 101, for example, the functional layer 102 may include a layer only having one kind (or type) of a crystal structure different from the crystal structure of the core 101.

In an embodiment, the core 101 may have a hexagonal crystal structure or a layered crystal structure, and the functional layer 102 may have one kind (or type) of crystal structure that is different from that of the core 101. For example, the different kind of crystal structure may be a cubic structure.

The functional layer 102 may have an average thickness ranging from about 3 nm to about 60 nm or about 5 nm to about 30 nm. When the average thickness of the functional layer 102 is greater than or equal to about 3 nm and less than or equal to about 60 nm, cycle-life characteristics may be improved, and a rechargeable lithium battery having high capacity may be realized. The average thickness of the functional layer may be measured by the TEM and the TEM results averaged from 5 points in the functional layer.

The positive active material 150 for a rechargeable lithium battery may include sulfur in a range of about 100 ppm to about 400 ppm, or about 100 ppm to about 200 ppm. When sulfur is included in a range of greater than or equal to about 100 ppm based on a total amount of the positive active material and less than or equal to about 400 ppm, a high-capacity rechargeable lithium battery may be realized and cycle-life characteristics of a rechargeable lithium battery may be improved.

As described, when the functional layer having one kind of a crystal structure different from the crystal structure of the core, is included in the positive active material, the structure of the positive active material may be more stable, so that the structure of the positive active material is more maintained during the charge and the discharge, thereby improving the cycle-life characteristics and stability of the battery.

Figure 2:
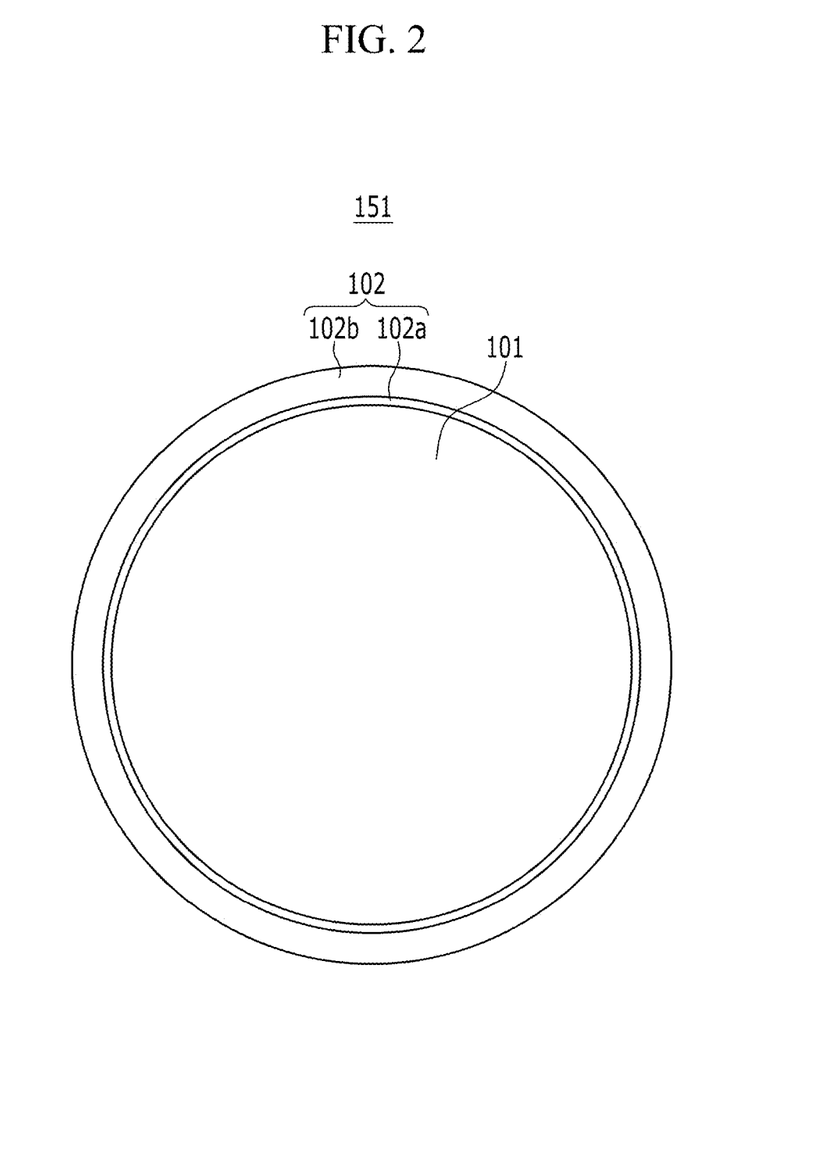
FIG. 2 shows a cross-section of a positive active material for a rechargeable lithium battery according to another example embodiment.

Hereinafter, referring to FIG. 2, a positive active material for a rechargeable lithium battery according to another example embodiment will be described. FIG. 2 shows a cross-section of a positive active material 151 for a rechargeable lithium battery according to another example embodiment. Herein, the duplicative description of the elements of the positive active material 151 that are the same as or substantially similar to the positive active material 150 according to FIG. 1 will not be provided.

Referring to FIG. 2, the positive active material 151 according to the present embodiment include a core 101 and a functional layer 102 on the surface of the core 101. The functional layer 102 may include a first layer 102a having at least two kinds (or types) of crystal structure and a second layer 102b on the surface of the first layer 102a. The second layer 102b may have at least one kind (or type) of a crystal structure that is different from that of the core 101.

In some embodiments, the first layer 102a may have a mixed structure of a cubic structure and a hexagonal structure. The second layer 102b may have the cubic structure. The second layer 102b may have both the cubic structure and the hexagonal structure, but the cubic structure may be more prevalent than the hexagonal structure. In some embodiments, the second layer 102b may have only the cubic structure (e.g., the crystal structure of the second layer 102b is only cubic). The hexagonal structure of the functional layer may be also a hexagonal structure or a layered hexagonal structure.

In the present embodiment, the first layer 102a may be disposed (e.g., positioned) on the surface of the core 101, and second layer 102b may be disposed on the surface of the first layer 102a. In other words, the second layer 102b may be the outermost layer of the positive active material 151 for a rechargeable lithium battery.

The functional layer 102 may have an average thickness of about 3 nm to about 60 nm or about 5 nm to about 30 nm. When the average thickness of the functional layer 102 is greater than or equal to about 3 nm and less than or equal to about 60 nm, cycle-life characteristics may be improved, and a high-capacity rechargeable lithium battery may be realized.

An average thickness of the first layer 102a may be in a range of about 2% to about 20% of the entire average thickness of the functional layer 102. When the first layer 102a has an average thickness within the above-recited range, structure degradation of the positive active material may be suppressed (or reduced) during the deintercalation and intercalation of lithium.

The positive active material for a rechargeable lithium battery according to example embodiments of the present disclosure may be prepared, for example, in a method including the acts of mixture, primary heat treatment, washing, dehydration, drying, and secondary heat treatment.

The mixture may for example include mixing a lithium-containing compound, a nickel-containing compound, a cobalt-containing compound, and Me-containing compound (where Me is Mn or Al). The nickel-containing compound, the cobalt-containing compound, the Me (where Me is Mn or aluminum)-containing compound may generally include S (sulfur) as impurities, for example, in an amount of 1,000 ppm to 2,000 ppm.

In some embodiments, the lithium-containing compound may be a lithium acetate, a lithium nitrate, a lithium hydroxide, a lithium carbonate, a hydrate thereof, or a combination thereof, without limitation.

The nickel-containing compound may be a nickel nitrate, a nickel hydroxide, a nickel carbonate, a nickel acetate, a nickel sulfate, a hydrate thereof, or a combination thereof, without limitation.

The cobalt-containing compound may be a cobalt nitrate, a cobalt hydroxide, a cobalt carbonate, a cobalt acetate, a cobalt sulfate, a hydrate thereof, or a combination thereof, without limitation.

The Me-containing compound may be a Me-containing nitrate, a Me-containing hydroxide, a Me-containing carbonate, a Me-containing acetate, a Me-containing sulfate, a hydrate thereof, or a combination thereof, without limitation.

The lithium-containing compound, the nickel-containing compound, the cobalt-containing compound, the Me-containing compound may be mixed by appropriately adjusting their mixing ratio to obtain the compound represented by Chemical Formula 1.

Next, the primary heat treatment may be performed, for example, at about 700° C. to about 1000° C. for about 5 hours to about 30 hours. In some embodiments, the primary heat treatment may be performed under an oxygen ($O_2$) atmosphere (e.g., pure $O_2$) or an air atmosphere. From the primary heat treatment, a core including a compound represented by Chemical Formula 1 may be prepared.

The washing may be performed, for example, by using a cleaning solution prepared by mixing a core (e.g., the core prepared during the primary heat treatment) and a solvent in a weight ratio of about 0.5 to about 1.5:1, and stirring the mixture for about 1 minute to about 60 minutes. The solvent may be water. If the mixing ratio of the core and the solvent is out of the above-described range, for example, if the solvent is used in excess or in too small amount, a suitable functional layer may not be formed.

Herein, the resulting mixed liquid may have pH ranging from about 3 to about 13, for example, about 7 to 13. The temperature of the solvent may be a range of about 15 to about 35° C.

In some embodiments, the solvent may be a basic solvent, with a base such as ammonia, sodium hydroxide or a combination thereof added to water. Herein, the concentration of the basic solvent may be controlled to obtain a pH of about 11.5 to about 13.5 of the basic solvent. For example, when ammonia is used as the base, the concentration of ammonia may be about 10 wt % to about 30 wt % based on the total weight of the basic solvent. When sodium hydroxide is used as the base, the concentration of sodium hydroxide may be about 5 wt % to about 15 wt % based on the total weight of the basic solvent.

During the washing, the amount of sulfur included in the core may be controlled.

After the dehydration and drying are performed, the secondary heat treatment may be performed at about 100° C. to about 700° C. to prepare a positive active material for a rechargeable lithium battery according to the example embodiments. For example, the dehydration process may be performed by any suitable method in the related art, and the drying may be performed at about 80 to about 240° C.

In one or more example embodiments, a rechargeable lithium battery includes a positive electrode including the positive active material, a negative electrode including a negative active material, and an electrolyte.

Figure 3:
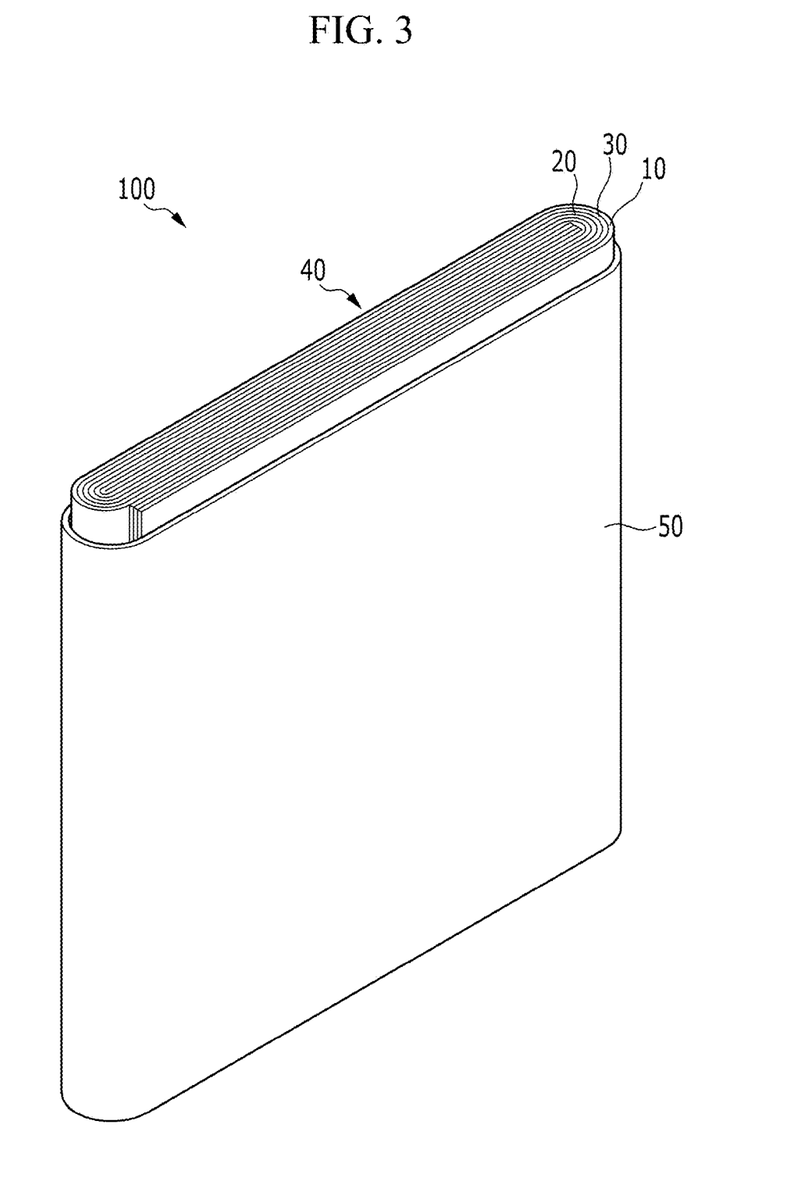
FIG. 3 schematically shows a rechargeable lithium battery according to an example embodiment.

FIG. 3 schematically shows a rechargeable lithium battery according to an example embodiment. In FIG. 3, a rechargeable lithium battery according to an example embodiment is illustrated as a prismatic battery, but is not limited thereto and may include variously-shaped batteries such as a cylindrical battery, a pouch battery, and/or the like.

Referring to FIG. 3, a rechargeable lithium battery 100 according to an embodiment includes an electrode assembly 40 manufactured by winding a separator 30 interposed between a positive electrode 10 and a negative electrode 20, and a case 50 housing the electrode assembly 40. An electrolyte may be impregnated in the electrode assembly 40.

The positive electrode 10 may include a positive active material layer, and a current collector supporting the positive active material layer. In the positive active material layer, an amount of the positive active material may be about 90 wt % to about 98 wt % based on the total weight of the positive active material layer.

In an embodiment, the positive active material layer may further include a binder and a conductive material. Herein, the binder and the conductive material may be included in an amount of about 1 wt % to about 5 wt %, respectively, based on the total amount of the positive active material layer.

The binder improves binding properties of positive active material particles with one another and with a current collector. Examples of the binder may be polyvinyl alcohol, carboxymethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto.

The conductive material is included to provide electrode conductivity. Any suitable electrically conductive material may be used as a conductive material unless it causes a chemical change. Examples of the conductive material include a carbon-based material such as natural graphite, artificial graphite, carbon black, acetylene black, ketjen black, carbon fiber and/or the like; a metal-based material such as copper, nickel, aluminum, silver, and/or the like, metal powder, metal fiber and/or the like; a conductive polymer such as a polyphenylene derivative and/or the like; or any mixture thereof.

The current collector may use Al, but is not limited thereto.

The negative electrode 20 may include a current collector and a negative active material layer formed on the current collector and including a negative active material.

The negative active material may include a material capable of reversibly intercalating/deintercalating lithium ions, a lithium metal, a lithium metal alloy, a material capable of doping/dedoping lithium, and/or a transition metal oxide, without limitation.

The material that can reversibly intercalate/deintercalate lithium ions may include a carbon material. The carbon material may be any suitable carbon-based negative active material applicable for use in a lithium ion rechargeable battery. Examples of the carbon material include crystalline carbon, amorphous carbon, and mixtures thereof, without limitation. The crystalline carbon may be non-shaped, and/or sheet, flake, spherical, and/or fiber shaped natural graphite and/or artificial graphite. The amorphous carbon may be a soft carbon, a hard carbon, a mesophase pitch carbonization product, fired coke, and/or the like.

The lithium metal alloy may include an alloy of lithium and an element selected from Na, K, Rb, Cs, Fr, Be, Mg, Ca, Sr, Si, Sb, Pb, In, Zn, Ba, Ra, Ge, Al, and Sn.

The material capable of doping/dedoping lithium may include Si, a Si—C composite, $SiO_x$ (0<x<2), a Si-Q alloy (wherein Q is an element selected from an alkali metal, an alkaline-earth metal, a Group 13 element, a Group 14 element, a Group 15 element, a Group 16 element, a transition metal, a rare earth element, and a combination thereof, and is not Si), Sn, $SnO_2$, a Sn—R alloy (wherein R is an element selected from an alkali metal, an alkaline-earth metal, a Group 13 element, a Group 14 element, a Group 15 element, a Group 16 element, a transition metal, a rare earth element, and a combination thereof, and is not Sn), and/or the like. At least one of these materials may be mixed with $SiO_2$. The elements Q and R may each independently be selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, and combinations thereof.

The transition metal oxide may include vanadium oxide, lithium vanadium oxide, and/or lithium titanium oxide, without limitation.

In the negative active material layer, the negative active material may be included in an amount of about 95 wt % to about 99 wt % based on the total weight of the negative active material layer.

In an embodiment, negative active material layer includes a binder, and optionally a conductive material. In the negative active material layer, a content of the binder may be about 1 wt % to about 5 wt % based on the total weight of the negative active material layer. When the negative active material layer includes a conductive material, the negative active material layer may include about 90 wt % to about 98 wt % of the negative active material, about 1 wt % to about 5 wt % of the binder, and about 1 wt % to about 5 wt % of the conductive material.

The binder improves binding properties of negative active material particles with one another and with a current collector. The binder may include a non-water-soluble binder, a water-soluble binder, or a combination thereof.

The non-water-soluble binder may be selected from polyvinylchloride, carboxylated polyvinylchloride, polyvinylfluoride, an ethylene oxide-containing polymer such as polyethylene oxide, polyvinylpyrrolidone, polyurethane, polytetrafluoroethylene, polyvinylidene fluoride, polyethylene, polypropylene, polyamideimide, polyimide, or combinations thereof.

The water-soluble binder may be a rubber-based binder or a polymer resin binder, without limitation. The rubber-based binder may be selected from a styrene-butadiene rubber, an acrylated styrene-butadiene rubber (SBR), an acrylonitrile-butadiene rubber, an acrylic rubber, a butyl rubber, a fluorine rubber, and combinations thereof. The polymer resin binder may be selected from ethylenepropylenecopolymer, polyepichlorohydrine, polyphosphazene, polyacrylonitrile, polystyrene, an ethylenepropylenediene copolymer, polyvinylpyridine, a chlorosulfonated polyethylene, latex, a polyester resin, an acrylic resin, a phenolic resin, an epoxy resin, polyvinyl alcohol, and combinations thereof.

When the water-soluble binder is used as a negative electrode binder, a cellulose-based compound may be further used to provide viscosity as a thickener. The cellulose-based compound may include one or more selected from carboxymethyl cellulose, hydroxypropylmethyl cellulose, methyl cellulose, and alkali metal salts thereof. The alkali metal may be Na, K, or Li, without limitation. The thickener may be included in an amount of about 0.1 to about 3 parts by weight based on 100 parts by weight of the negative active material.

The conductive material is included to provide electrode conductivity. Any suitable electrically conductive material may be used as a conductive material unless it causes a chemical change. Non-limiting examples of the conductive material include a carbon-based material such as natural graphite, artificial graphite, carbon black, acetylene black, ketjen black, a carbon fiber, and/or the like; a metal-based material such as a metal powder or a metal fiber including copper, nickel, aluminum, silver, and/or the like; a conductive polymer such as a polyphenylene derivative; and mixtures thereof.

The current collector may include one selected from a copper foil, a nickel foil, a stainless steel foil, a titanium foil, a nickel foam, a copper foam, a polymer substrate coated with a conductive metal, and any combination thereof, but is not limited thereto.

The electrolyte may include a non-aqueous organic solvent and a lithium salt.

The non-aqueous organic solvent serves as a medium for transmitting ions taking part in the electrochemical reaction of a battery.

The non-aqueous organic solvent may include a carbonate-based, ester-based, ether-based, ketone-based, alcohol-based, and/or aprotic solvent, without limitation.

The carbonate-based solvent may include dimethyl carbonate (DMC), diethyl carbonate (DEC), dipropyl carbonate (DPC), methylpropyl carbonate (MPC), ethylpropyl carbon- ate (EPC), methylethyl carbonate (MEC), ethylene carbonate (EC), propylene carbonate (PC), butylene carbonate (BC), and/or the like. The ester-based solvent may include methyl acetate, ethyl acetate, n-propyl acetate, dimethylacetate, methylpropionate, ethylpropionate, decanolide, mevalonolactone, caprolactone, and/or the like. The ether-based solvent may include dibutyl ether, tetraglyme, diglyme, dimethoxyethane, 2-methyltetrahydrofuran, tetrahydrofuran, and/or the like. The ketone-based solvent may include cyclohexanone and/or the like. The alcohol-based solvent may include ethyl alcohol, isopropyl alcohol, and/or the like. Examples of the aprotic solvent include nitriles such as R—CN (where R is a C2 to C20 linear, branched, or cyclic hydrocarbon, or may be include a double bond, an aromatic ring, or an ether bond), amides such as dimethylformamide, dioxolanes such as 1,3-dioxolane, sulfolanes, and/or the like.

The organic solvent may be used alone or in a mixture. When the organic solvent is used in a mixture, the mixture ratio may be controlled in accordance with a desirable (or suitable) battery performance.

The carbonate-based solvent may include a mixture with a cyclic carbonate and a linear carbonate. The cyclic carbonate and linear carbonate may be mixed together in a volume ratio of about 1:1 to about 1:9. When the mixture is used as the non-aqueous organic solvent, it may realize enhanced performance.

The organic solvent may further include an aromatic hydrocarbon-based solvent, in addition to the carbonate-based solvent. The carbonate-based solvent and aromatic hydrocarbon-based solvent may be mixed together in a volume ratio of about 1:1 to about 30:1.

The aromatic hydrocarbon-based organic solvent may be an aromatic hydrocarbon-based compound represented by Chemical Formula 2:

Chemical Formula 2

In Chemical Formula 2, $R_1$ to $R_6$ are the same or different and may each independently be selected from hydrogen, a halogen, a C1 to C10 alkyl group, a haloalkyl group, and a combination thereof.

Non-limiting examples of the aromatic hydrocarbon-based organic solvent may include benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and any combination thereof.

The electrolyte may further include an additive selected from vinylene carbonate, an ethylene carbonate-based compound represented by Chemical Formula 3, and propane-sultone, to improve cycle life.

Chemical Formula 3

In Chemical Formula 3, $R_7$ and $R_8$ are the same or different and may be each independently selected from hydrogen, a halogen, a cyano group (CN), a nitro group ($NO_2$), and a C1 to C5 fluoroalkyl group, provided that at least one of $R_7$ and $R_8$ is a halogen, a cyano group (CN), a nitro group ($NO_2$), or a C1 to C5 fluoroalkyl group, and $R_7$ and $R_8$ are not simultaneously hydrogen.

Examples of the ethylene carbonate-based compound include difluoro ethylenecarbonate, chloroethylene carbonate, dichloroethylene carbonate, bromoethylene carbonate, dibromoethylene carbonate, nitroethylene carbonate, cyanoethylene carbonate, and fluoroethylene carbonate, without limitation. The amount of the additive for improving cycle life may be flexibly used within an appropriate range.

The lithium salt dissolved in an organic solvent supplies a battery with lithium ions, facilitates the basic operation of the rechargeable lithium battery, and improves transportation of the lithium ions between positive and negative electrodes. Non-limiting examples of the lithium salt include at least one supporting salt selected from $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ (where x and y are natural numbers, for example, integers of 1 to 20), LiCl, LiI, and $LiB(C_2O_4)_2$ (lithium bis(oxalato) borate; LiBOB). A concentration of the lithium salt may range from about 0.1 M to about 2.0 M. When the lithium salt is included at the above concentration range, an electrolyte may have excellent (or suitable) performance and lithium ion mobility due to optimal (or desired) electrolyte conductivity and viscosity.

The rechargeable lithium battery may further include a separator 30 between the negative electrode and the positive electrode, depending on a kind (or type) of the battery as shown in FIG. 3. Examples of a suitable separator material include polyethylene, polypropylene, polyvinylidene fluoride, and multi-layers thereof such as a polyethylene/polypropylene double-layered separator, a polyethylene/polypropylene/polyethylene triple-layered separator, and a polypropylene/polyethylene/polypropylene triple-layered separator.

Hereinafter, the present disclosure will be described with reference to Examples and Comparative Examples. It will be understood, however, that these examples are provided for illustrative purposes only, and do not in any way limit the present disclosure.

Example 1

Lithium hydroxide, nickel hydroxide, cobalt hydroxide, and aluminum hydroxide were mixed in a mole ratio of Li:Ni:Co:Al=1:0.85:0.13:0.02.

The mixture was heat-treated at 700 to 800° C. under an oxygen ($O_2$) atmosphere for 20 hours to prepare a $LiNi_{0.85}CO_{0.13}Al_{0.02}O_2$ positive active material core.

The positive active material core was mixed with water in a weight ratio of 1:0.75 (about 1.33:1) and stirred for 10 minutes to perform a washing process, dehydrated, and dried, and then, heat-treated at 700° C. to form a 5 nm-thick crystallized functional layer on the surface of the core, thus obtaining a positive active material. The mixture of the positive active material core and water had a pH of about 7.5 and drying was performed at 180° C.

Herein, the positive active material core had a hexagonal structure, and the functional layer had a cubic structure overall. In addition, a sulfur content of the positive active material was 300 ppm.

94 wt % of the positive active material, 3 wt % of a polyvinylidene fluoride binder, and 3 wt % of a ketjen black conductive material were mixed in an N-methylpyrrolidone solvent to prepare a positive active material composition. This positive active material composition was coated on an Al current collector to manufacture a positive electrode.

The positive electrode, a lithium metal counter electrode, and an electrolyte were used to manufacture a coin a half-cell in a suitable method. The electrolyte was prepared by dissolving 1.0 M $LiPF_6$ in a mixed solvent of ethylene carbonate and diethyl carbonate (in a volume ratio of 50:50).

Example 2

A positive active material was prepared according to the same (or substantially the same) method as in Example 1 except for adjusting the washing process in which the positive active material core was mixed with water at a weight ratio of about 1:1 to form a first layer having a cubic and hexagonal mixed structure on the surface of the positive active material core and a second layer having a cubic structure on the surface of the first layer to form a functional layer including the first and second layers, and adjusting the washing process to have a sulfur content of 200 ppm. Herein, the first layer and the second layer had an average thickness ratio of 1:4. The mixture of the positive active material core and water had a pH of about 7.5.

Then, a positive electrode was manufactured according to the same method as in Example 1 and used to manufacture a coin half-cell.

Example 3

A positive active material was prepared according to the same (or substantially the same) method as in Example 1 except for adjusting the washing process in which NaOH was added to water to prepare a basic solvent (concentration: 5 wt %) with a pH about 12.5 and the positive active material core and the basic solvent were mixed at a weight ratio of about 1:0.75 (about 1.33:1) to have a sulfur content of 400 ppm.

Subsequently, a positive electrode was manufactured according to the same method as in Example 1 and used to manufacture a coin half-cell.

Example 4

A positive active material was prepared according to the same (or substantially the same) method as Example 1 except for adjusting the washing process in which the positive active material core was mixed with water at a weight ratio of about 1:1.5 (about 0.67:1) to form a first layer having a cubic and hexagonal mixed structure on the surface of the positive active material core and a second layer having a cubic structure on the surface of the first layer to form a functional layer including the first and second layers, and adjusting the washing process to have a sulfur content of 100 ppm. Herein, the first layer and the second layer had an average thickness ratio of 1:4. The mixture of the positive active material core and water had a pH of about 7.5.

Then, a positive electrode was manufactured according to the same method as in Example 1 and used to manufacture a coin half-cell.

Comparative Example 1

A positive active material was manufactured according to the same (or substantially the same) method as in Example 1 except for adjusting the washing process in which NaOH was added to water to prepare a basic solvent (concentration: 5 wt %) with a pH of about 12.5, and the positive active material core and the basic solvent were mixed at a weight ratio of about 1:0.5. The resulting positive active material had only a hexagonal structure without a separate functional layer and had a sulfur content of 1000 ppm.

Subsequently, a positive electrode was manufactured according to the same method as in Example 1 and used to manufacture a coin half-cell.

Comparative Example 2

A positive active material was prepared according to the same (or substantially the same) method as in Example 1 except for adjusting the washing process in which the positive active material core was mixed with water at a weight ratio of about 1:0.5 to forma functional layer having a cubic and hexagonal structure on the surface of the positive active material core and to have a sulfur content of 500 ppm.

Subsequently, a positive electrode was manufactured according to the same method as in Example 1 and used to manufacture a coin half-cell.

Comparative Example 3

A positive active material was prepared according to the same (or substantially the same) method as in Example 1 except for adjusting the washing process in which the positive active material core was mixed with water at a weight ratio of about 1:3 to form a functional layer having a cubic and hexagonal structure on the surface of the positive active material core and to have a sulfur content of 30 ppm.

Subsequently, a positive electrode was manufactured according to the same method as in Example 1 and used to manufacture a coin half-cell.

For the positive active materials according to Examples 1 to 4 and Comparative Examples 1 to 3, a crystal structure, an average thickness of each functional layer, and sulfur contents of the positive active materials are shown in Table 1.

TABLE 1

| | Crystal structure of functional layer | Average thickness of functional layer (nm) | Sulfur content (ppm) |
| --- | --- | --- | --- |
| Example 1 | cubic structure | 5 | 300 |
| Example 2 | cubic structure + hexagonal structure (first layer) + | 25 first layer:second | 200 |

TABLE 1-continued

|  | Crystal structure of functional layer | Average thickness of functional layer (nm) | Sulfur content (ppm) |
|---|---|---|---|
|  | cubic structure (second layer) | layer = 1:4 (average thickness ratio) |  |
| Example 3 | cubic structure | 5 | 400 |
| Example 4 | cubic structure + hexagonal structure (first layer) + cubic structure (second layer) | 25 first layer:second layer = 1:4 (average thickness ratio) | 100 |
| Comparative Example 1 | — | — | 1000 |
| Comparative Example 2 | cubic structure + hexagonal structure | 5 | 500 |
| Comparative Example 3 | cubic structure + hexagonal structure | 5 | 30 |

Experimental Example 1

The half-cells according to Examples 1 to 4 and Comparative Examples 1 to 3 were 200 times charged and discharged at 1 C within a range of 3.0 V to 4.3 V at 25° C. to measure discharge capacity. In addition, capacity retention was obtained by calculating a discharge capacity ratio of discharge capacity at $200^{th}$ cycle relative to discharge capacity at $1^{st}$ cycle, which was regarded as a cycle-life.

The results are shown in Table 2.

TABLE 2

|  | 0.2 C Capacity [mAh/g] | Cycle Life [capacity retention @200 cycles] |
|---|---|---|
| Example 1 | 205 | 92.5% |
| Example 2 | 204 | 93.1% |
| Example 3 | 205 | 92.2% |
| Example 4 | 204 | 93.0% |
| Comparative Example 1 | 205 | 88.1% |
| Comparative Example 2 | 203 | 89.4% |
| Comparative Example 3 | 196 | 90.3% |

Referring to Table 2, the half-cells including the positive active material according to Examples 1 to 4 of embodiments of the present disclosure showed excellent capacity and excellent cycle-life characteristics at the $200^{th}$ cycle compared with the half-cells according to Comparative Examples 1 to 3.

Experimental Example 2: Crystal Structure of Functional Layer of Positive Active Material FIGS. 4 and 7 show the measurement results of the surface of each positive active material according to Example 2 and Comparative Example 2, respectively, by using a high-resolution transmission electron microscope (HR-TEM).

Figure 4:
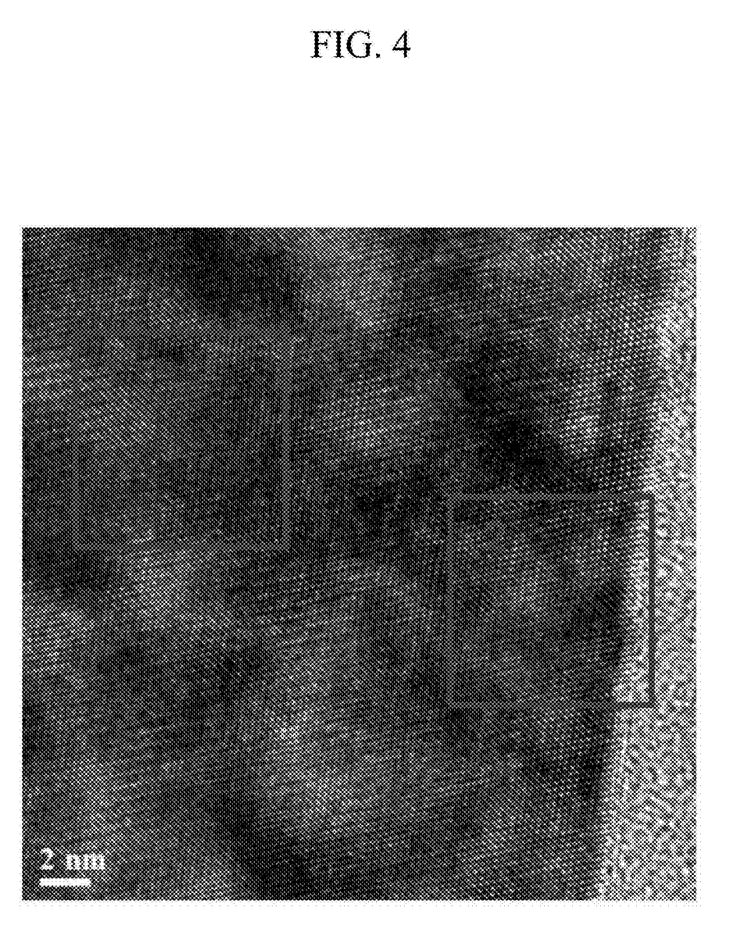
FIG. 4 shows a high-resolution transmission electron microscopy (TEM) result about the surface of the positive active material according to Example 2.
Figure 5:
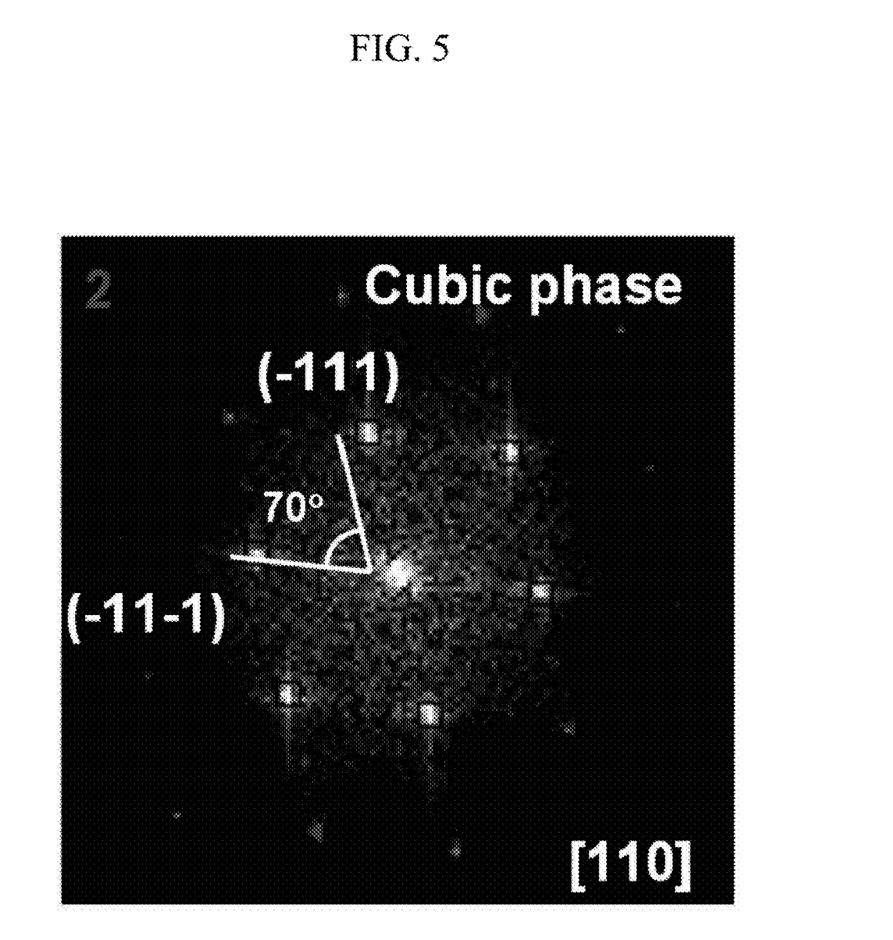
FIGS. 5 and 6 respectively show fast Fourier transform patterns of FIG. 4.
Figure 6:
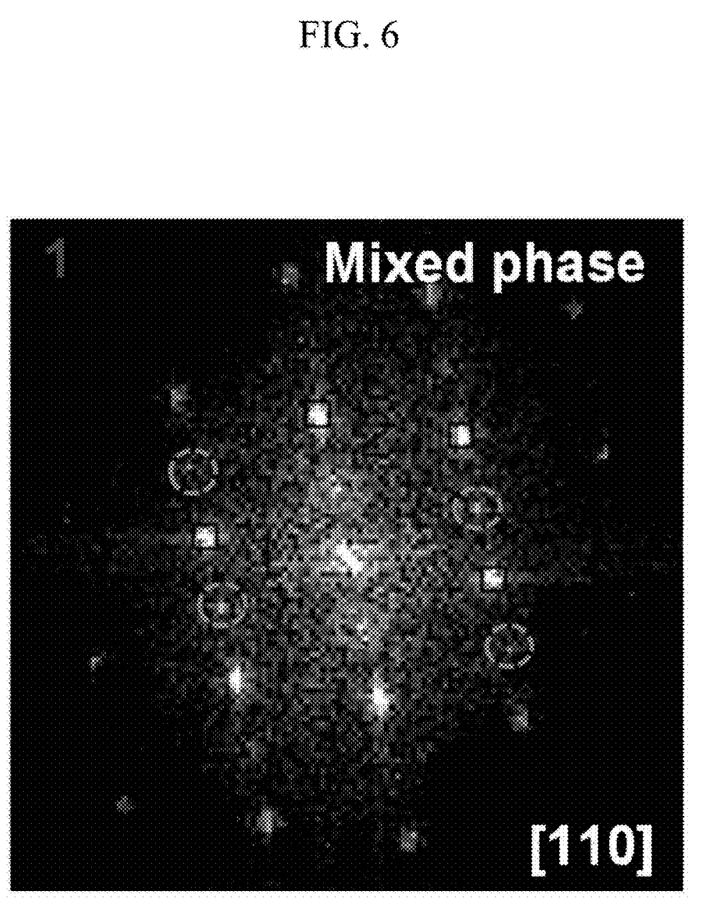

FIG. 5 shows FFT (fast Fourier transform) patterns at Quadrangle No. 2 of FIG. 4 (Example 2), FIG. 6 shows FFT (fast Fourier transform) patterns at Quadrangle No. 1 of FIG. 4.

Specifically, FIG. 5 shows fast Fourier transform patterns of the second layer (an average thickness about 20 nm) on the surface of a first layer, and FIG. 6 shows fast Fourier transform patterns of the first layer between the surface of a core and the second layer. Referring to FIGS. 5 and 6, a functional layer of the positive active material of Example 2 was disposed (e.g., positioned) on the surface of a core and included a first layer having a mixed structure of a cubic structure and a hexagonal structure and a second layer on the surface of the first layer and having the cubic structure.

Figure 7:
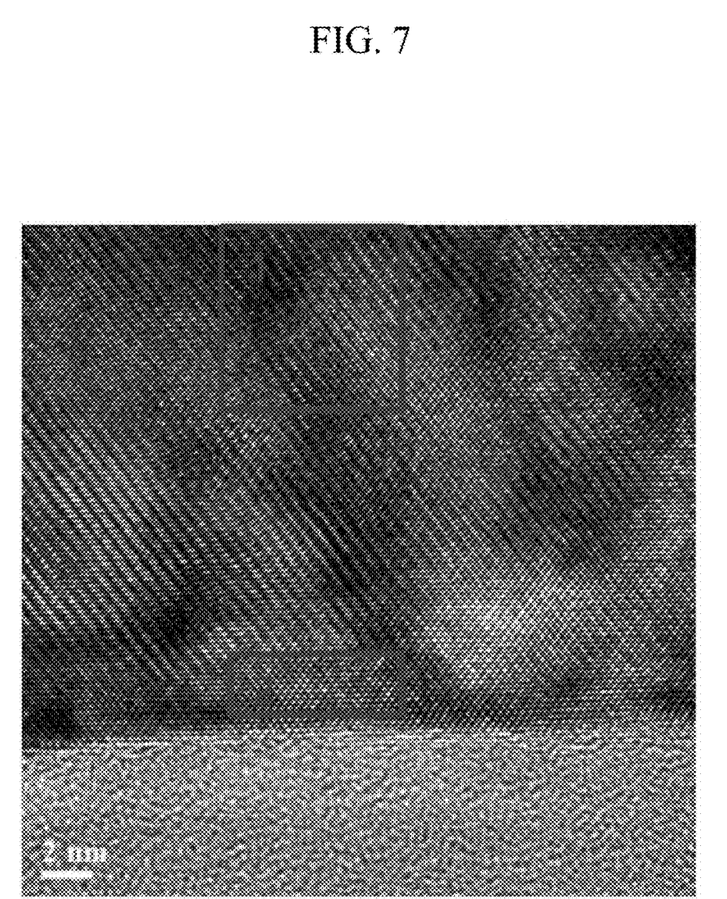
FIG. 7 shows a high-resolution transmission electron microscopy (TEM) result about the surface of a positive active material according to Comparative Example 2.
Figure 8:
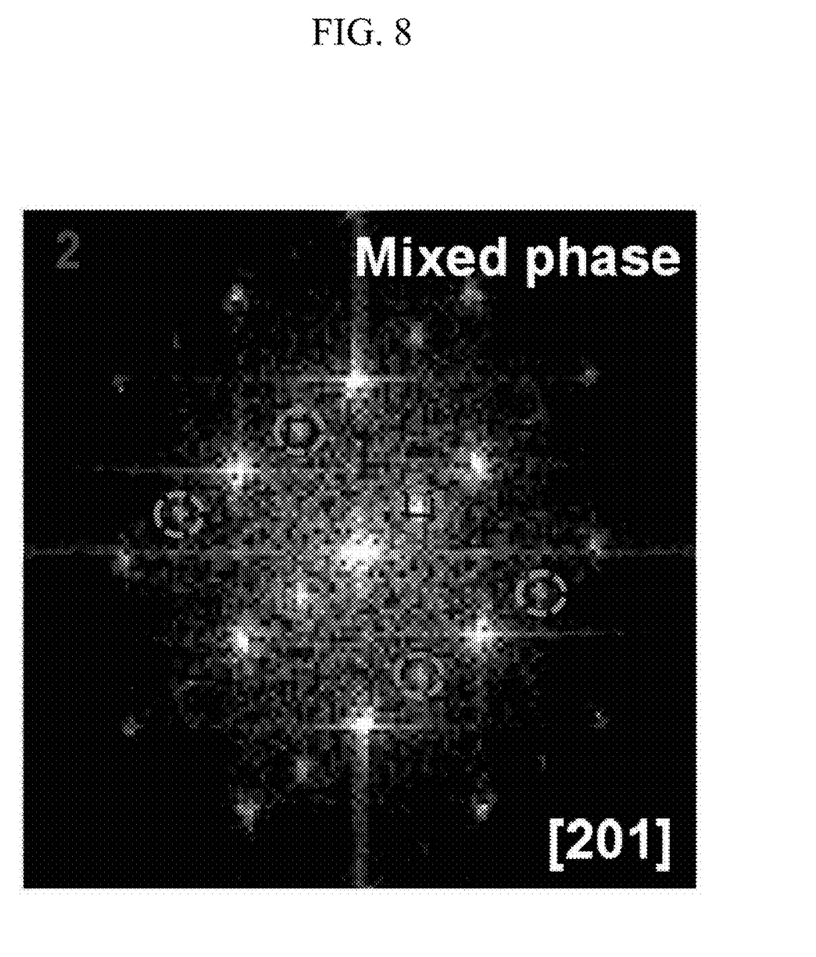
FIGS. 8 and 9 respectively show fast Fourier transform patterns of FIG. 7.
Figure 9:
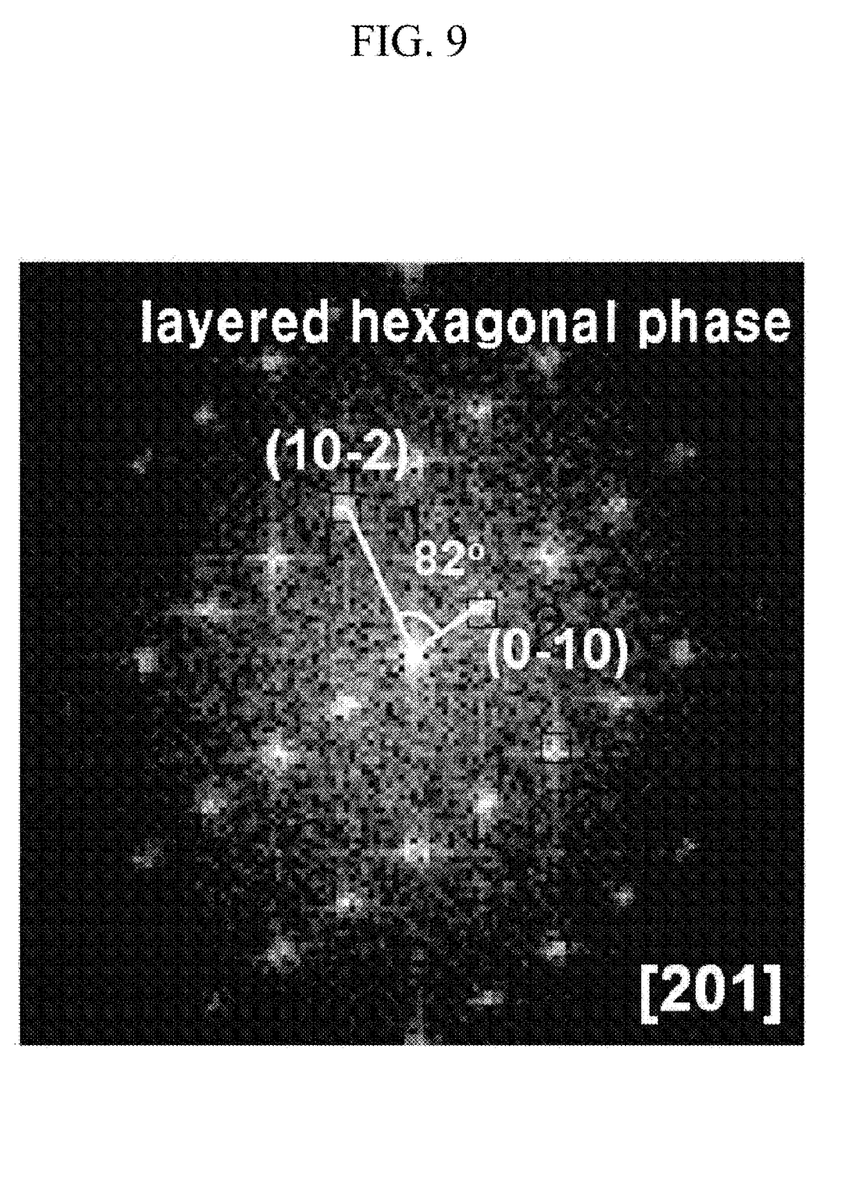

FIG. 8 shows fast Fourier transform (FFT) patterns at Quadrangle No. 2 of FIG. 7 (Comparative Example 2), and FIG. 9 shows fast Fourier transform (FFT) patterns at Quadrangle No. 1 of FIG. 7.

Specifically, FIG. 8 shows fast Fourier transform patterns of the functional layer (an average thickness of about 5 nm), and FIG. 9 shows fast Fourier transform patterns of the core. Referring to FIGS. 8 and 9, the functional layer of the positive active material according to Comparative Example 2 was present on the surface of the core, wherein the core had only a layered hexagonal structure and the functional layer on the surface of the core had a cubic and hexagonal mixed structure.

Accordingly, when the functional layer according to example embodiments is formed to have only a cubic structure, or is formed to include a first layer having a cubic and hexagonal-mixed structure and a second layer having a cubic structure, on the surface of positive active material core having a hexagonal structure, degradation of a surface structure of the positive active material may be suppressed (or reduced) during the intercalation/deintercalation of lithium, and thus cycle-life characteristics of a rechargeable lithium battery cell may be improved. In addition, when the functional layer has the above-described crystal structure, and the positive active material also has a sulfur content ranging from 50 ppm to 400 ppm, a rechargeable lithium battery cell having excellent capacity and simultaneously improved cycle-life characteristics may be realized.

As used herein, the terms "use," "using," and "used" may be considered synonymous with the terms "utilize," "utilizing," and "utilized," respectively.

In addition, the terms "substantially," "about," and similar terms are used as terms of approximation and not as terms of degree, and are intended to account for the inherent deviations in measured or calculated values that would be recognized by those of ordinary skill in the art.

Also, any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

As used herein, the term "major component" refers to a component that is present in a composition, polymer, or product in an amount greater than an amount of any other single component in the composition or product.

While this disclosure has been described in connection with what is presently considered to be practical example embodiments, it is to be understood that the invention is not limited to the disclosed embodiments. On the contrary, it is intended to cover various modifications and equivalent arrangements included within the spirit and scope of the present disclosure, as defined by the appended claims and equivalents thereof.

DESCRIPTION OF SYMBOLS

101: core
102: functional layer
100: rechargeable lithium battery
10: positive electrode
20: negative electrode
30: separator
40: electrode assembly
50: case

What is claimed is:

1. A positive active material for a rechargeable lithium battery, the positive active material comprising:
    a core comprising a compound represented by Chemical Formula 1; and
    a functional layer on a surface of the core, an average thickness of the functional layer being about 3 nm to about 60 nm,
    wherein the positive active material comprises about 100 ppm to about 400 ppm of sulfur,
    wherein a portion of the functional layer directly on the core consists of a same compound as the compound represented by Chemical Formula 1 comprised in the core, and the same compound in the portion of the functional layer is of a first crystal structure different from a second crystal structure of the compound comprised in the core,
    wherein the functional layer comprises a first layer having a mixed structure of a cubic crystal structure and a hexagonal crystal structure, and a second layer having a cubic crystal structure different from the second crystal structure of the core, and
    wherein in the cubic crystal structure different from the second crystal structure of the core, an angle between a (−111) plane and a (−11-1) plane is about 70 degrees:

$$Li_aNi_xCo_yMe_zO_2, \quad \text{Chemical Formula 1}$$

in Chemical Formula 1, 0.9≤a≤1.1, 0.85≤x≤0.93, 0<y≤0.3, 0<z≤0.3, x+y+z=1, and
Me is Al.

2. The positive active material of claim 1, wherein the positive active material comprises about 100 ppm to about 200 ppm of sulfur.

3. The positive active material of claim 1, wherein the functional layer comprises a layer that has only the first crystal structure different from the second crystal structure of the core.

4. The positive active material of claim 1, wherein the first crystal structure of the functional layer is a cubic structure.

5. The positive active material of claim 1, wherein the second crystal structure of the core is a hexagonal structure or a layered hexagonal structure.

6. The positive active material of claim 1, wherein an average thickness of the first layer is 2% to 20% of a total average thickness of the functional layer.

7. The positive active material of claim 1, wherein the first layer is on the surface of the core, and
    the second layer is on the surface of the first layer.

8. A rechargeable lithium battery comprising:
    a positive electrode comprising the positive active material of claim 1;
    a negative electrode comprising a negative active material; and
    an electrolyte.

9. The positive active material of claim 1, wherein the second layer has only the cubic crystal structure different from the second crystal structure of the core.

10. The positive active material of claim 1, wherein the second layer has the cubic crystal structure different from the second crystal structure of the core, and
    wherein the cubic crystal structure different from the second crystal structure of the core is present in the second layer as a major component.

11. A positive active material for a rechargeable lithium battery, the positive active material comprising:
    a core comprising a compound represented by Chemical Formula 1; and
    a functional layer on a surface of the core, an average thickness of the functional layer being about 3 nm to about 60 nm,
    wherein the positive active material comprises about 100 ppm to about 400 ppm of sulfur,
    wherein a portion of the functional layer directly on the core consists of a same compound as the compound represented by Chemical Formula 1 comprised in the core, and the same compound in the portion of the functional layer is of a first crystal structure different from a second crystal structure of the compound comprised in the core,
    wherein the functional layer comprises a first layer having a mixed structure of a cubic crystal structure and a hexagonal crystal structure, and a second layer having a cubic crystal structure different from the second crystal structure of the core, and
    wherein in the cubic crystal structure different from the second crystal structure of the core, an angle between a (−111) plane and a (−11-1) plane is about 70 degrees:

$$Li_aNi_xCo_yMe_zO_2, \quad \text{Chemical Formula 1}$$

in Chemical Formula 1, 0.9≤a≤1.1, 0.85≤x≤0.93, 0<y≤0.3, 0<z≤0.3, x+y+z=1, and
Me is Mn or Al.

12. The positive active material of claim 1, wherein the second layer comprises a mixed structure of the cubic crystal structure and a hexagonal crystal structure, the cubic crystal structure being more prevalent than the hexagonal structure.

* * * * *